(12) United States Patent
Karilainen

(10) Patent No.: US 11,354,008 B2
(45) Date of Patent: Jun. 7, 2022

(54) VISUAL NOTIFICATION

(71) Applicant: Microsoft Technology Licensing, LLC, Redmond, WA (US)

(72) Inventor: Antti Karilainen, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 15/233,910

(22) Filed: Aug. 10, 2016

(65) Prior Publication Data

US 2018/0046327 A1 Feb. 15, 2018

(51) Int. Cl.
| | |
|---|---|
| *G06F 3/0481* | (2022.01) |
| *H04M 1/22* | (2006.01) |
| *H04M 19/04* | (2006.01) |
| *G06F 3/01* | (2006.01) |

(52) U.S. Cl.
CPC ........... *G06F 3/0481* (2013.01); *G06F 3/016* (2013.01); *H04M 1/22* (2013.01); *H04M 19/048* (2013.01)

(58) Field of Classification Search
CPC ...... G06F 3/016; G06F 3/0481; G06F 1/1656; G06F 3/0416; G06F 1/1626; H02J 7/1461; H04B 1/3888; H04L 9/32; H04M 1/0202; H04M 1/0256; H04M 1/0277; H04M 1/0283; H04M 1/12; H04M 1/21; H04M 1/22; H04M 1/576; H04M 1/72519; H04M 1/72527; H04M 1/72544; H04M 1/72547; H04M 1/7253; H04M 1/72563; H04M 19/04; H04M 19/048; H04M 1/0235; H04M 1/016; H05K 5/0004; H05K 5/0217; H04W 4/80; H04W 12/06; H04W 68/005; G02B 6/002
See application file for complete search history.

(56) References Cited

U.S. PATENT DOCUMENTS

| | | | |
|---|---|---|---|
| 5,946,636 A | 8/1999 | Uyeno et al. | |
| 6,127,933 A * | 10/2000 | Ohmura | H04M 1/72519 340/635 |
| 6,438,390 B1 | 8/2002 | Awan | |
| 6,831,568 B1 * | 12/2004 | Cortopassi | G06F 1/1626 340/309.16 |

(Continued)

FOREIGN PATENT DOCUMENTS

CN 104618567 A 5/2015

OTHER PUBLICATIONS

"International Search Report and Written Opinion Issued in PCT Application No. PCT/US2017/045202", dated Nov. 2, 2017, 16 Pages.

(Continued)

*Primary Examiner* — Ankur Jain

(57) ABSTRACT

In an embodiment, an apparatus comprises a primary user interface, a housing of non-translucent material, a slot of translucent material arranged in the housing, the slot having a primary function not related to user interaction, and a light source arranged inside the housing in proximity of the slot; wherein the apparatus has a primary mode in which the primary user interface is on and a secondary mode in which the primary user interface is off, and wherein the apparatus further comprises a controller configured to provide visual notifications to a user with the light source in response to predetermined events when the apparatus is in the secondary mode.

20 Claims, 4 Drawing Sheets

(56) References Cited

U.S. PATENT DOCUMENTS

| | | |
|---|---|---|
| 7,660,609 B2 | 2/2010 | Karan et al. |
| 9,002,326 B2 | 4/2015 | Santo et al. |
| 2001/0018332 A1 | 8/2001 | Lustila et al. |
| 2006/0116178 A1* | 6/2006 | Vuong ............... H04M 1/72566 455/574 |
| 2007/0241971 A1* | 10/2007 | Tsujimura ............... G06F 1/165 343/702 |
| 2009/0251384 A1* | 10/2009 | Ligtenberg ........... H01H 13/705 343/904 |
| 2010/0079996 A1* | 4/2010 | Shon ...................... G02B 6/002 362/246 |
| 2010/0197358 A1 | 8/2010 | Steer et al. |
| 2011/0124367 A1* | 5/2011 | Hull ........................ H04M 1/22 455/550.1 |
| 2011/0195753 A1 | 8/2011 | Mock et al. |
| 2013/0054706 A1 | 2/2013 | Graham et al. |
| 2013/0162124 A1* | 6/2013 | Miyaoka .............. H05K 5/0217 312/223.1 |
| 2013/0165100 A1* | 6/2013 | Moran .................... H04M 1/21 455/418 |
| 2014/0141838 A1 | 5/2014 | Cai et al. |
| 2014/0247188 A1* | 9/2014 | Nakano ................ H04B 5/0031 343/702 |
| 2014/0268629 A1 | 9/2014 | Krishnaswamy et al. |
| 2015/0050965 A1 | 2/2015 | Perry |
| 2015/0117502 A1* | 4/2015 | Chen ...................... G01R 29/10 375/219 |
| 2015/0173040 A1* | 6/2015 | Gao ...................... H04W 68/02 455/412.2 |
| 2015/0187187 A1 | 7/2015 | Del Toro et al. |
| 2015/0249292 A1* | 9/2015 | Ouyang ................... H01Q 1/48 343/702 |
| 2016/0192517 A1* | 6/2016 | Tsao ...................... H05K 13/00 361/679.01 |
| 2016/0224299 A1* | 8/2016 | Lim ...................... H04M 19/048 |
| 2017/0365135 A1* | 12/2017 | Gupta ................... G06F 3/0482 |

OTHER PUBLICATIONS

Xu, et al., "Shimmering Smartwatches: Exploring the Smartwatch Design Space", In Proceedings of the Ninth International Conference on Tangible, Embedded, and Embodied Interaction, Jan. 15, 2015, pp. 69-76.

* cited by examiner

VISUAL NOTIFICATION

BACKGROUND

Electronic devices typically have communication interfaces to communicate with other devices. Various applications, present in a portable device may utilize these interfaces to communicate. Notification mechanisms may be provided to notify a user of incoming communications. Further, notification mechanisms may be utilized for other applications, for example, to remind a user about an upcoming task. Typical notification mechanisms may include audio, visual and haptic mechanisms. A user may be notified by playing audio on a speaker, showing visuals on a screen, vibrating the device body etc.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

An apparatus is described. In an embodiment, an apparatus comprises a primary user interface, a housing comprising non-translucent material, a slot of translucent material arranged in the housing, the slot having a primary function not related to user interaction, and a light source arranged inside the housing in proximity of the slot; wherein the apparatus has a primary mode in which the primary user interface is on and a secondary mode in which the primary user interface is off, and wherein the apparatus further comprises a controller configured to provide visual notifications to a user with the light source in response to predetermined events when the apparatus is in the secondary mode.

In other embodiments, a device and a method are discussed.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings. It should be noted that the embodiments illustrated in the drawings are illustrative only and may not be to scale.

DETAILED DESCRIPTION

Figure 1:
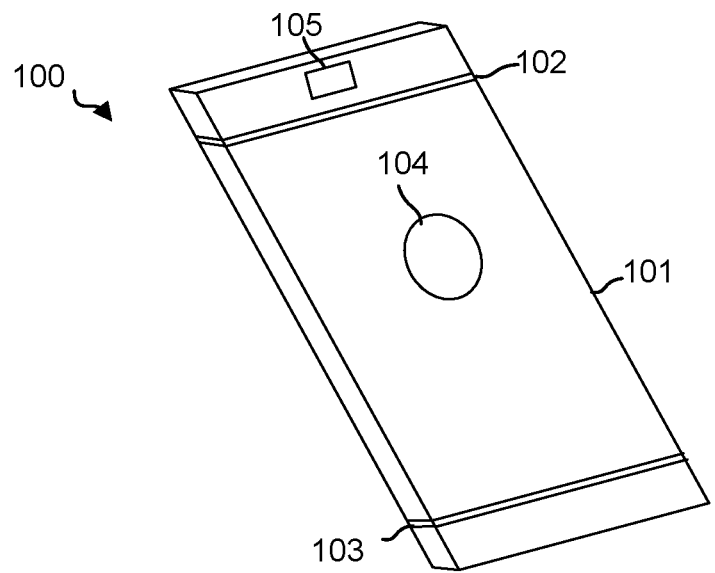
FIG. 1 illustrates a schematic representation of a device, showing a non-translucent device housing with translucent slots, according to an embodiment.

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in a smartphone, this is only an example implementation and not a limitation. As those skilled in the art will appreciate, the present embodiments are suitable for application in a variety of different types of devices comprising an opaque or non-translucent housing, for example mobile phones, tablet computers, phablets, portable game consoles, 2-in-1 laptops/tablets, laptops, media players etc.

A myriad of devices which comprise at least one communication interface exist and are popular, including but not limited to smartphones, mobile phones, wearable devices, laptops, tablets, phablets, game consoles, media players, cameras, smart speakers, etc. These devices may typically include a primary user interface which may be used to notify a user of an event. These events may be an incoming communication or other events like alarms, reminders or expiry of a timer, or state of a digital assistant hosted in the device. A primary user interface may include a display screen, a speaker, a microphone, a haptic actuator or a combination thereof. A haptic actuator may be any actuator able to cause vibration in the device which may be felt by a user. A notification may be, for example, a popup on the graphical user-interface, a sound played via a speaker, a vibration in the device, a visual notification, or a combination thereof. Typically to implement visual notifications, light sources are incorporated in the device. These light sources need optical openings in the device housing to be able to emit light outside of the device. It may be advantageous to reduce openings or slots in the device housing, particularly in devices comprising a so-called uni-body. However, some slots in the device housing may be necessary for other functions of a device, for example, communication. Radio antennas in a device may necessitate slots in the housing, for example if the housing is conductive. Communication ports, charging ports, audio and/or video ports/jacks may also necessitate slots in the device housing. Brand logos within the structure of the device housing may also result in one or more slots in the device housing. According to an embodiment, a slot already present in a device housing needed for a function other than user interaction may be used for visual notifications when a primary user interface, for example a display, is disabled or inaccessible to a user. According to an embodiment, light sources may be arranged in proximity of such slots to implement visual notifications. According to an embodiment, dedicated slots for light sources to implement visual notifications may be eliminated. According to an embodiment, aesthetic quality and/or physical robustness of a device may be improved by using slots already present in the device housing for visual notifications. According to an embodiment, light sources comprising multiple colors may be arranged in proximity of such slots to implement visual notifications. According to an embodiment, the slots may comprise translucent material. According to an embodiment, the device may comprise a controller configured to control the light sources. According to an embodiment, when a primary user interface is turned off or un-accessible, the controller causes visual notifications by turning on the light sources, in response to an event. According to an embodiment, visual notifications may be chromatically, spatially or pulse/pulse-width coded depending upon the event in response to which the visual notification is caused. According to an embodiment, the visual notifications may be used to provide an indication of a state of a digital assistant configured in the device. According to an embodiment, the state of a digital assistant configured in the device may include, whether the assistant is in a listening mode or not, whether the assistant is in communication with a network, a simulated mood of the assistant etc.

FIG. 1 illustrates a schematic representation of a device 100 as viewed from the backside, according to an embodiment. Device 100 may comprise a device housing 101 made of non-translucent material which does not allow visible light to pass through it. There may be slots 102, 103, 104, 105 in the device housing 101. Slots may have various purposes, for example slot 105 may be an optical opening for a camera. Slots 102 and 103 may be needed for antennas, for example to act as or to allow portions of device housing 101 to act as antennas. Slot 104 may comprise a logo, for example a brand logo. According to an embodiment, transparent or translucent material may be arranged in slots 102, 103 and 104. According to an embodiment, slots 102 and 103 may comprise airgaps in the device housing 101 material. Back side may refer to a side of the device comprising slots 102, 103, 104, 105. According to an embodiment, back side of device 100 may refer to a side not comprising a display screen (not shown in FIG. 1) of the device 100. According to an embodiment, a slot 102, 103, 104, 105 may be configured on any side of the device 100, as determined by its primary function.

Referring to FIG. 1, light sources (not shown in FIG. 1) may be arranged inside the device on or in proximity of the slots 102, 103 and 104; configured to provide visual notifications when prompted by a controller (not shown in FIG. 1a). The controller may prompt the light sources to provide visual notifications based on events like an incoming communication or an alarm, when a primary user interface of the device 100 is turned off.

Figure 2:
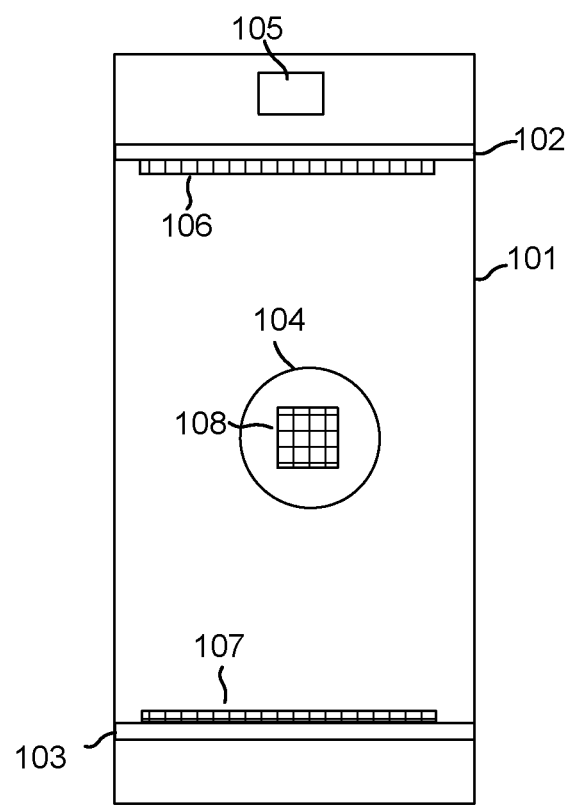
FIG. 2 illustrates a schematic representation of a portion of device housing 101 from the inside, according to an embodiment.

FIG. 2 illustrates a schematic representation of a portion of device housing 101 from the inside, according to an embodiment. Inside may refer to the surface of device housing 101 not exposed to the user after the device 100 is assembled. Device housing 100 may comprise a non-translucent material such that it does not allow visible light to pass through. According to an embodiment, device housing 100 comprises an aluminum uni-body. Device housing 101 may comprise slots 102 and 103, needed, for example, for antenna operation. Device housing 101 may further comprise slot 105 adapted for a camera and slot 104 configured for a brand logo. A light source 106 may be configured adjacent to slot 102 such that the light emitted by light source 106 travels to outside the device housing 101 via slot 102. Light source 107 may be configured adjacent to slot 103 such that the light emitted by light source 107 travels to outside the device housing 101 via slot 103. A light source 108 may be arranged in proximity of or directly in the slot 104 comprising a brand logo. According to an embodiment, translucent or transparent non-conductive material may be configured in slots 102, 103 and 104 to guide and/or diffuse light emitted by light sources 106, 107 and 108 respectively, so that it reaches to outside of the device housing 101. According to an embodiment, one or more of light sources 106, 107, 108 may comprise multiple light sources adapted spatially such that different visual patterns may be created. According to an embodiment, one or more of light sources 106, 107, 108 may comprise multiple light sources emitting light of different colors. According to an embodiment, light sources 106, 107, 108 may be configured in proximity or over translucent material configured in slots 102, 103, 104 respectively. According to an embodiment, at least one of the light sources 106, 107, 108 may be configured substantially away from a corresponding slot 102, 103, 104 and light may be guided from the light source 106, 107, 108 to its corresponding slot 102, 103, 104 using a means to guide light, for example, an optical fiber, lenses, prisms etc. According to an embodiment, each of the light sources 106, 107, 108 may comprise one or more light emitting diodes (LEDs).

Referring to FIG. 2, light sources 106, 107, 108 may be controlled by a controller (not shown in FIG. 2), configured to turn on the light sources to provide visual notifications, in response to predetermined events when a primary user interface of the device 100 is disabled or inaccessible to the user. These pre-determined events may include an incoming communication, expiry of a timer, alerts, alarms, reminders or other notifications, state of a digital assistant inside the device etc. According to an embodiment, an incoming communication may include a voice call, a video call, a text message, an instant message, a social media notification, an email, a weather update, or a traffic update etc.

Figure 3:
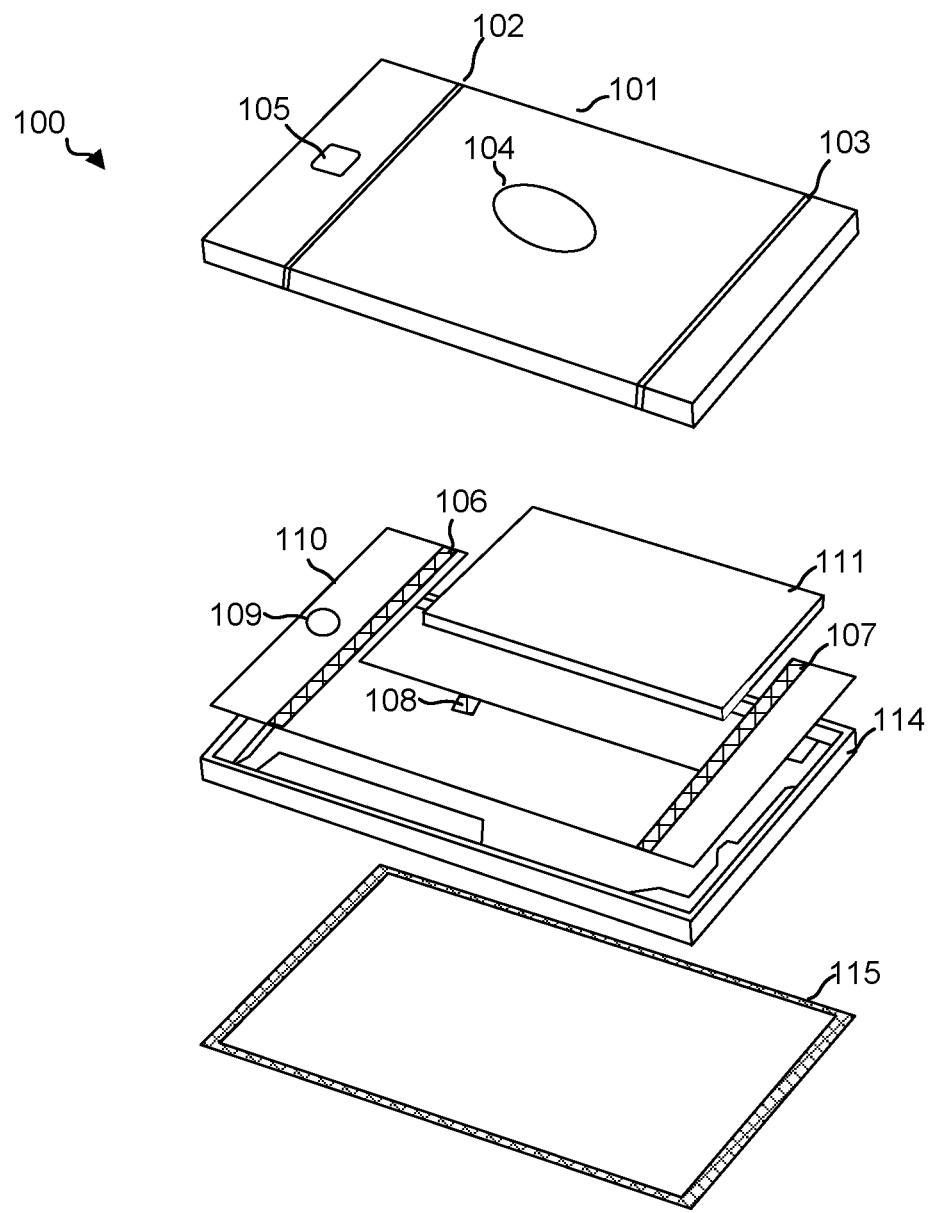
FIG. 3 illustrates a schematic representation of a blown up view of a device, according to an embodiment.

FIG. 3 illustrates a blown up view of a device 100 according to an embodiment. Device 100 may comprise device housing 101, a printed circuit board (PCB) 110, a battery 111, a chassis 114 and a display screen 115. Device housing 101 may comprise slot 105 for a camera 109 configured on PCB 110. Device housing 101 may comprise slots 102, 103 to enable antenna operation and slot 104 may be adapted for a brand logo. Various components and chips like application processors, digital signal processors, controllers etc. (not shown in FIG. 3) may be configured on PCB 110. Further light source 106 corresponding to slot 102, light source 108 corresponding to slot 104 and light source 107 corresponding to slot 103 may be configured on PCB 110. The light sources 106, 107 and 108 may be configured such that when the device is assembled, their position is under or in proximity of slots 102, 103, 104 respectively, configured to emit light to outside of the device 100. According to an embodiment, one or more of the light sources 106, 107, 108, may comprise multiple light sources separated spatially and/or emitting different colors. According to an embodiment, on or more of the light sources 106, 107, 108, may be partially configured on PCB 110 and partially on the inner surface of housing 101. According to an embodiment one or more of the light sources 106, 107, 108 may be configured on the inner surface of housing 101 of device 100, while corresponding connection points/pins (not shown in FIG. 3) for power and/or control may be configured on the PCB 110.

Referring to FIG. 3, light sources 106, 107, 108 may be controlled by a controller (not shown in FIG. 3), configured to turn on the light sources to provide visual notifications, in response to predetermined events when a primary user interface, for example display screen 115, of the device 100 is disabled or inaccessible to the user. These pre-determined events may include an incoming communication, expiry of a timer, alerts, alarms, reminders or other notifications, state of a digital assistant inside the device etc. According to an embodiment, an incoming communication may include a voice call, a video call, a text message, an instant message, a social media notification, an email, a weather update, or a traffic update etc.

Figure 4:
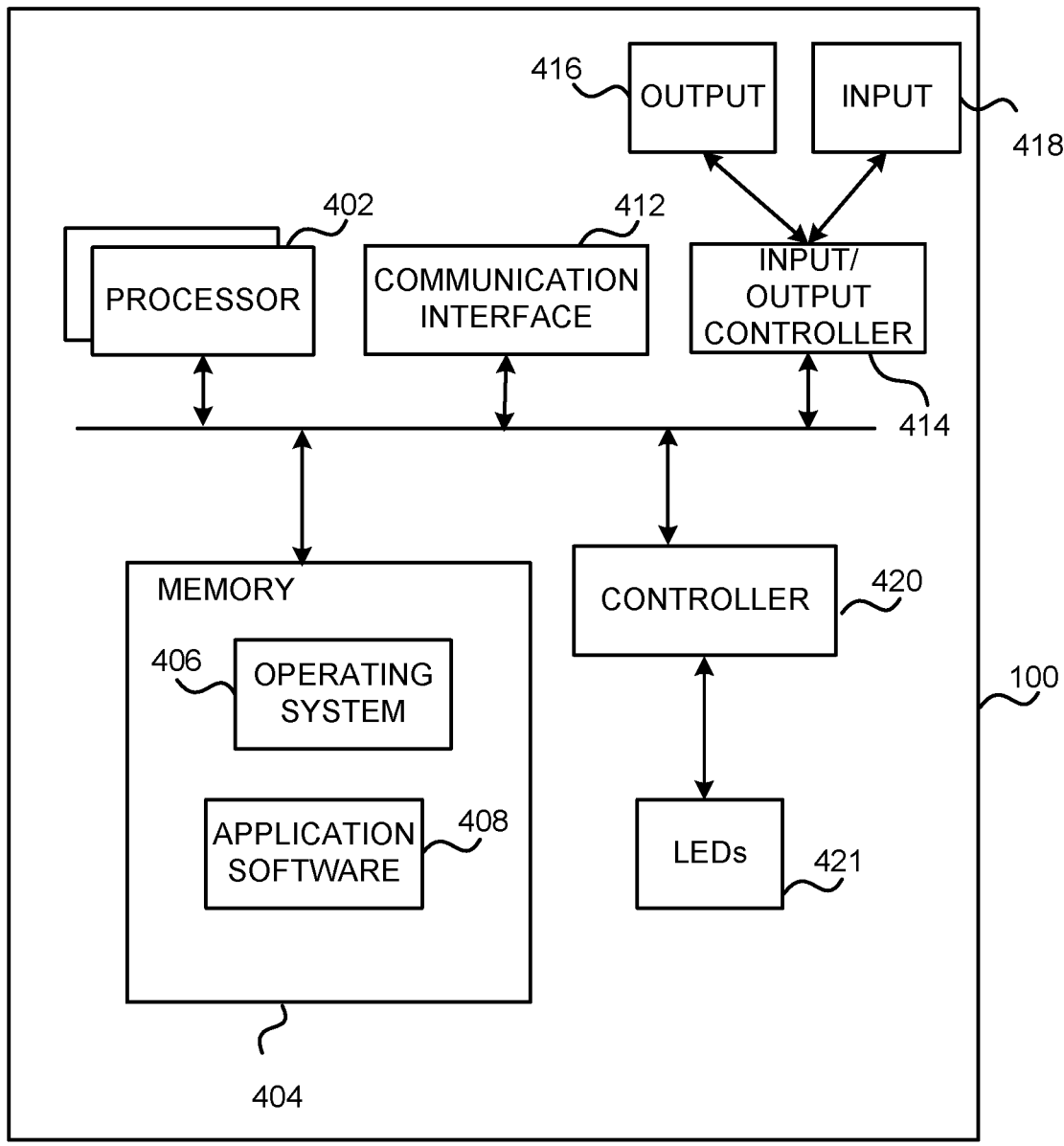
FIG. 4 illustrates a schematic representation of a computing device as a functional block diagram, according to an embodiment.

FIG. 4 illustrates an example of components of a computing device 100 which may be implemented as a form of a computing and/or electronic device. The computing device 100 comprises one or more processors 402 which may be microprocessors, controllers or any other suitable type of processors for processing computer executable instructions to control the operation of the apparatus 100. Platform software comprising an operating system 406 or any other suitable platform software may be provided on the apparatus to enable application software 408 to be executed on the device. According to an embodiment, application software 408 may comprise instructions implementing a digital assistant.

Computer executable instructions may be provided using any computer-readable media that are accessible by the device 100. Computer-readable media may include, for example, computer storage media such as a memory 404 and communications media. Computer storage media, such as a memory 404, include volatile and non-volatile, removable and non-removable media implemented in any method or technology for storage of information such as computer readable instructions, data structures, program modules. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Although the computer storage medium (the memory 404) is shown within the device 100, it will be appreciated by a person skilled in the art, that the storage may be distributed or located remotely and accessed via a network or other communication link (e.g. using a communication interface 412).

The device 100 may comprise an input/output controller 414 arranged to output information to an output device 416 which may be separate from or integral to the device 100. The input/output controller 414 may also be arranged to receive and process an input from one or more input devices 418. In one embodiment, the output device 416 may also act as the input device. The input/output controller 414 may also output data to devices other than the output device, e.g. a locally connected printing device. The device 100 may comprise a controller 420 configured to control light sources 421. According to an embodiment, the light sources 421 may comprise light sources 106, 107 and 108 of embodiments illustrated in FIG. 2 and FIG. 3, arranged as described therein. According to an embodiment, visual notifications in response to a detected event may be provided if a primary user interface is disabled or inaccessible, for example if a screen is turned off or the device 100 is in silent mode. According to an embodiment, the device may 100 may comprise two modes: a primary mode wherein a primary user interface is available, and a secondary mode wherein the primary user interface is turned off or inaccessible. For example, in the secondary mode, a display screen may be off, a speaker and/or microphone may be turned off, a haptic actuator may be turned off etc. In the primary mode notifications may be made available via a primary user interface. Visual notifications may be provided by turning on the light sources 421 in the secondary mode. Controller 420 may determine the mode of the device 100 and if it is in a secondary mode, detect events and provide visual notifications in response to the detected events, by controlling the turning on and off of the light sources 421. According to an embodiment, events may include incoming communications like incoming voice or video calls, incoming text, instant, or multimedia messages, incoming e-mails etc. According to an embodiment, events may include reminders, alarms, expiry of timers, state of a digital assistant implemented in the device etc. According to an embodiment, the controller 420 may divide the detected events into categories. These categories may include type of event, priority of event, and initiator of the event, etc. Initiator of an event may be for example a caller, a sender of a message or an email, an application hosted in the device, a web based service providing financial, weather, traffic, news or emergency alerts, etc. According to an embodiment, the controller 420 may provide different visual notifications for different categories of events. According to an embodiment, the notifications may be different in color, placement of the light sources 421 in the device housing, in frequency of turning on/off or a combination thereof. As an example in response to an event comprising an incoming communication from a spouse or parent of the user, the event may be categorized as a high priority event by the controller 420 and it may provide a corresponding visual notification for example flashing red and blue lights from multiple light sources 421 of device 100. According to an embodiment, the device 100 as shown in FIG. 1 or FIG. 3, may be established with the features of FIG. 4, for example the operating system 406 and the application software 408 working jointly, and executed by the processor 402.

The functionality described herein can be performed, at least in part, by one or more hardware logic components. According to an embodiment, controller 420 is integrated with and/or its functionality implemented by processor 402 executing instructions stored in memory 404. According to an embodiment, the computing device 100 is configured by the program code 406,408 when executed by the processor 402 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 5:
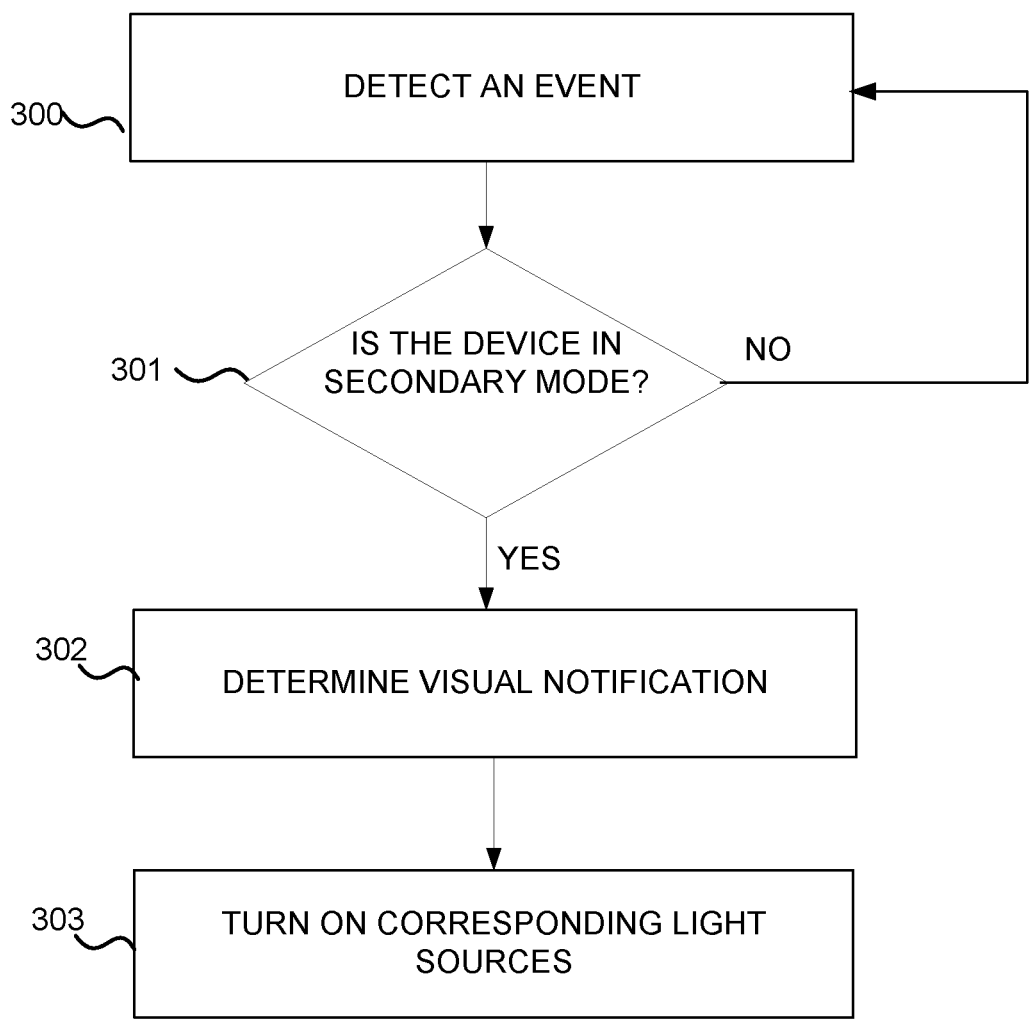
FIG. 5 illustrates a schematic flow chart of a method in accordance with an embodiment.

FIG. 5 illustrates, as a schematic flow chart, a method of providing visual notifications in a device comprising a controller 420, in accordance with an embodiment. Referring to FIG. 5, according to an embodiment, the method comprises operations 300, 301, 302 and 303. According to an embodiment, the method of FIG. 5 may be compiled into the program code 406,408, implementing controller 420. According to an embodiment, the process of FIG. 5 may be carried out by controller 420, wherein controller 420 comprises a physical circuit.

Operation 300 may comprise detecting an event. The event may be an incoming communication, an alarm, a reminder, expiry of a timer or a message from an application hosted in device 100 or state of a digital assistant hosted in device 100.

Operation 301 may comprise detecting whether a device 100 is in a primary mode or in a secondary mode. In the primary mode a primary user interface may be available in the device 100 or accessible to user, while in the secondary mode, a primary user interface may be unavailable or inaccessible to the user. The primary user interface may be a graphical interface, an audio interface, or a haptic interface or a combination thereof. In secondary mode one or more of a display screen 115, a speaker, and a haptic actuator of the device may be turned off. If the device is in the secondary mode, operation 302 may be performed. If the device is in the primary mode, Operation 300 may be performed again.

Operation 302 may comprise determining a visual notification for the detected event. This may include categorizing the event in terms of event originator, priority of event, type of event etc. There may be different visual notifications possible comprising a pattern in color, intensity or spatial location of the light source 421, 106, 107, 108, providing the visual notification.

Operation 303 may include turning on the light sources 106, 107, 108, 421 corresponding to the visual notification determined in operation 302, the light sources 421, 106, 107, 108 being configured in proximity of slots in a device housing and having a primary purpose other than user interaction.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include disks, thumb drives, memory etc. and do not include propagated signals. Propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The embodiments illustrated and described herein as well as embodiments not specifically described herein but within the scope of aspects of the disclosure constitute exemplary means for providing visual notifications when a device is in a secondary mode. For example, the elements illustrated in FIG. 1 to FIG. 4 constitute exemplary means of housing a device, exemplary means of emitting light, exemplary processing means, exemplary means of communication, exemplary means of operating light sources, exemplary user interfaces and exemplary means of storage.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

An embodiment relates to a device comprising: a primary user interface, a housing comprising non-translucent material, a slot of translucent material arranged in the housing, the slot having a primary function not related to user interaction, and a light source arranged inside the housing in proximity of the slot, wherein the apparatus has a primary mode in which the primary user interface is on, and a secondary mode in which the primary user interface is off; and wherein the apparatus further comprises a controller configured to provide visual notifications to a user with the light source in response to predetermined events when the apparatus is in the secondary mode.

Alternatively or in addition to the above, the housing comprises a conductive material. Alternatively or in addition to the above, the primary function of the slot is allowing operation of an antenna. Alternatively or in addition to the above, the predetermined event is arrival of one or more of: an electronic mail message, a text message, a multimedia message, an instant message, a voice call, a voice over internet protocol message, and a video call. Alternatively or in addition to the above, the predetermined event is one or more of: expiry of a time period, a reminder, or an alarm, a state of a digital assistant. Alternatively or in addition to the above, the visual notification comprises turning on and off of the light source. Alternatively or in addition to the above, the visual notification comprises strobing of the light source. Alternatively or in addition to the above, the light source comprises at least one Light Emitting Diode. Alternatively or in addition to the above, the controller is configured to categorize the detected predetermined events and provide different visual notifications for different categories of events. Alternatively or in addition to the above, the visual notifications for different categories differ in at least one of color of the visual notification, duration of the visual notification or frequency of on-off cycles of light source. Alternatively or in addition to the above, the controller comprises a processor and a memory containing instructions. Alternatively or in addition to the above, in the secondary mode a speaker of the apparatus is turned off. Alternatively or in addition to the above, in the secondary mode, a haptic actuator of the apparatus is turned off. Alternatively or in addition to the above, according to an embodiment, the device comprises multiple slots of translucent material, the slots having a primary function not related to user interaction and a light source arranged in proximity of each of the multiple slots. Alternatively or in addition to the above, light sources corresponding to different slots are configured to emit light of different colors.

An embodiment relates to a device comprising: at least one display screen, a housing comprising non-translucent material, a slot in the housing, the slot having a primary function not related to user interaction, and at least one light source arranged inside the housing in proximity of the slot, wherein the device has a primary mode in which the at least one display screen is on and a secondary mode, in which the display screen is off, and wherein the device further comprises a controller configured to provide visual notifications to a user with the at least one light source, in response to predetermined events when the apparatus is in the secondary mode.

An embodiment relates to a method executed in a controller comprised in a device, the method comprising: determining whether a device is in a primary mode or in a secondary mode, wherein in the primary mode, a primary user interface of the device is on and in the secondary mode a primary user interface of the device is off, detecting occurrence of an event, providing a visual notification in response to the event, wherein providing a visual notification comprises operating a light source arranged in proximity of a slot in a non-translucent housing of the device, wherein primary function of the slot is unrelated to visual notifications.

Alternatively or in addition to the above, the method comprises categorizing the detected events, and providing different visual notifications for events of different categories. Alternatively or in addition to the above, visual notifications in response to events of different categories differ in one or more of: a pattern of turning on/off of the light source, a color sequence for the light source, a strobe frequency for the light source, and an intensity of light emitted by the light source. Alternatively or in addition to the above, the categorization of an event is based on one or more of: priority of the event, originator of the event and nature of the event.

The invention claimed is:

1. A client device comprising:
a primary user interface including a display;
a conductive housing comprising conductive material;
an antenna within the conductive housing;
an antenna slot of translucent non-conductive material arranged in proximity to the antenna in the conductive housing, the translucent non-conductive antenna slot enabling an operation of the antenna within the conductive housing; and
a light source arranged inside the conductive housing adjacent to the translucent non-conductive antenna slot so as to radiate light through the translucent non-conductive antenna slot;
wherein the client device is configured to operate in a first mode in which the display is on and in a second mode in which the display is disabled; and
a controller configured to:
detect a predetermined event at the client device;
in response to detecting the predetermined event, determine whether the client device is in the first mode or the second mode;
if the client device is in the second mode:
categorize the detected predetermined event; and
provide a visual notification to a user with the light source, wherein the visual notification is a first type of notification of a plurality of distinct notification types selected in accordance with the categorization of the detected predetermined event; and
if the client device is in the first mode, forgo providing the visual notification, wherein the visual notifications for different categories differ in color of the visual notification and duration of the visual notification based on a priority of the predetermined event, the priority of the predetermined event based at least on an originator of the predetermined event.

2. The client device of claim 1, wherein conductive material is aluminum.

3. The client device of claim 2, wherein the conductive housing is a uni-body.

4. The client device of claim 1, wherein the detected predetermined event is arrival of one or more of: an electronic mail message, a text message, a multimedia message, an instant message, a voice call, a voice over internet protocol message, and a video call.

5. The client device of claim 1, wherein the detected predetermined event is one or more of: expiry of a time period, a reminder, an alarm, and a state of a digital assistant.

6. The client device of claim 1, wherein in the second mode the phone is on silent.

7. The client device of claim 1, wherein the visual notification comprises strobing of the light source.

8. The client device of claim 1, wherein the light source comprises at least one Light Emitting Diode.

9. The client device of claim 1, wherein the visual notifications for different categories differ in color of the visual notification and duration of the visual notification.

10. The client device of claim 9, wherein the visual notifications for different categories further differ in frequency of on-off cycles of light source.

11. The client device of claim 1, wherein the controller comprises a processor and a memory containing instructions.

12. The client device of claim 1, wherein in the second mode a speaker of the client device is turned off.

13. The client device of claim 1, wherein in the second mode, a haptic actuator of the client device is turned off.

14. The client device of claim 1, further comprising multiple slots of translucent material, the slots having a primary function not related to user interaction and a light source arranged in proximity of each of the multiple slots.

15. The client device of claim 14, wherein light sources corresponding to different slots and are configured to emit light of different colors, wherein each of the different colors represent a different notification.

16. A computer-readable storage device comprising computer-executable instructions that, when executed by one or more processors, cause the one or more processors to perform operations comprising:
detecting a predetermined event at a client device comprising:
a conductive housing made of conductive material; and
an antenna slot of translucent material arranged in proximity to an antenna within the conductive housing, the translucent non-conductive antenna slot enabling the antenna to operate within the conductive housing by providing an opening within the conductive material;
in response to detecting the predetermined event, determining whether the client device is in a first mode in which a display is on or a second mode in which a display is disabled;

if the client device is in the second mode:
  categorizing the detected predetermined event; and
  providing a visual notification to a user with a light source arranged inside the conductive housing of the client device in proximity of the translucent non-conductive antenna slot so as to radiate light through the translucent non-conductive antenna slot, wherein the visual notification is a first type of notification of a plurality of distinct notification types selected in accordance with the categorization of the detected predetermined event; and
  if the client device is in the first mode, forgo providing the visual notification, wherein the visual notifications for different categories differ in color of the visual notification and duration of the visual notification based on a priority of the predetermined event, the priority of the predetermined event based at least on an originator of the predetermined event.

17. A method executed in a controller comprised in a client device, the method comprising:
  detecting a predetermined event at the client device comprising:
    a conductive housing made of conductive material; and
    an antenna slot of translucent material arranged in proximity to an antenna, the translucent non-conductive antenna slot enabling the antenna to operate within the conductive housing of conductive material by providing an opening within the conductive material;
  in response to detecting the predetermined event, determining whether the client device is in a first mode in which a display is on or a second mode in which a display is disabled;
  if the client device is in the second mode:
    categorizing the detected predetermined event; and
    providing a visual notification to a user with a light source arranged inside the conductive housing in proximity of the translucent non-conductive antenna slot so as to radiate light through the translucent non-conductive antenna slot, wherein the visual notification is a first type of notification of a plurality of distinct notification types selected in accordance with the categorization of the detected predetermined event; and
  if the client device is in the first mode, forgo providing the visual notification, wherein the visual notifications for different categories differ in color of the visual notification and duration of the visual notification based on a priority of the predetermined event, the priority of the predetermined event based at least on an originator of the predetermined event.

18. The method of claim 17, wherein the visual notification comprises turning on and off of the light source.

19. The method of claim 17, wherein visual notifications in response to events of different categories may differ in one or more of: a pattern of turning on/off of the light source, a color sequence for the light source, a strobe frequency for the light source, and an intensity of light emitted by the light source.

20. The method of claim 17, wherein the categorization of an event is based on one or more of: priority of the event, originator of the event and nature of the event.

* * * * *